(12) United States Patent
Hashimoto et al.

(10) Patent No.: US 11,862,888 B2
(45) Date of Patent: Jan. 2, 2024

(54) CONNECTOR CAPABLE OF SUPPRESSING TEMPERATURE RISE USING HEAT STORAGE MATERIAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuki Hashimoto, Mie (JP); Katsuhiko Aizawa, Mie (JP); Akihiro Hayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 232 days.

(21) Appl. No.: 17/420,797

(22) PCT Filed: Dec. 24, 2019

(86) PCT No.: PCT/JP2019/050470
§ 371 (c)(1),
(2) Date: Jul. 6, 2021

(87) PCT Pub. No.: WO2020/145118
PCT Pub. Date: Jul. 16, 2020

(65) Prior Publication Data
US 2022/0069508 A1    Mar. 3, 2022

(30) Foreign Application Priority Data

Jan. 11, 2019  (JP) ................................ 2019-003685

(51) Int. Cl.
*H01R 13/502*    (2006.01)
*B60L 53/16*    (2019.01)

(52) U.S. Cl.
CPC ............ *H01R 13/502* (2013.01); *B60L 53/16* (2019.02); *H01R 2201/26* (2013.01)

(58) Field of Classification Search
CPC ........................ H01R 13/502; H01R 2201/26; H01R 13/533; B60L 53/16; Y02T 10/70; Y02T 10/7072; Y02T 90/14; H02J 7/00
See application file for complete search history.

(56) References Cited

U.S. PATENT DOCUMENTS

2019/0020140 A1   1/2019  Fuehrer et al.
2019/0322186 A1* 10/2019  Arai ........................ H01B 9/00
2022/0013946 A1*  1/2022  Fujihira ............... H01R 13/639

FOREIGN PATENT DOCUMENTS

JP    2007-258010 A    10/2007
JP    2018-026273 A    2/2018
JP    2018-156896 A    10/2018

OTHER PUBLICATIONS

International Search Report dated Feb. 10, 2020 for WO 2020/145118 A1 (4 pages).

* cited by examiner

*Primary Examiner* — Michael C Zarroli
(74) *Attorney, Agent, or Firm* — Venjuris, P.C.

(57) ABSTRACT

A vehicle-side connector 1 includes a connector housing 10, a plurality of vehicle-side terminals 50 and heat storage bodies 70. The heat storage body 70 includes a case 71 accommodated in the connector housing 10 and heat storage materials 76 accommodated in the case 71.

11 Claims, 5 Drawing Sheets

CONNECTOR CAPABLE OF SUPPRESSING TEMPERATURE RISE USING HEAT STORAGE MATERIAL

CROSS REFERENCE TO RELATED APPLICATIONS

This application is a national phase of PCT application No. PCT/JP2019/050470, filed on 24 Dec. 2019, which claims priority from Japanese patent application No. 2019-003685, filed on 11 Jan. 2019, all of which are incorporated herein by reference.

TECHNICAL FIELD

The present invention relates to a connector.

BACKGROUND

Conventionally, a vehicle such as a plug-in hybrid electric vehicle or an electric vehicle includes a charging connector for charging an equipped power storage device (see, for example, Patent Document 1). Such a vehicle includes various harnesses and various connectors including terminal connecting portions for connecting the harnesses as members for connecting the charging connector and the power storage device.

PRIOR ART DOCUMENT

Patent Document

Patent Document 1: JP 2018-026273 A

SUMMARY OF THE INVENTION

Problems to be Solved

For example, in the above vehicle, a large current is required for an increase in capacity, the shortening of a charging time and the like of the equipped power storage device. Then, the temperature of the connector is largely increased by heat generation in the terminal connecting portion of the connector caused by energization. Thus, it is desired to suppress a temperature rise at the time of energization in the connector including the terminal connecting portion such as the charging connector.

The present invention was developed to solve the above problem and aims to provide a connector capable of suppressing a temperature rise at the time of energization.

Means to Solve the Problem

A connector for solving the above problem is provided with a terminal, a connector housing for holding the terminal, and a heat storage body accommodated in the connector housing, wherein the heat storage body includes a case accommodated in the connector housing and a heat storage material accommodated in the case.

According to this configuration, the connector generates heat due to a large current flowing when the connector is used. Since the heat storage material of the heat storage body absorbs the heat generated in the terminal, sudden temperature rises of the terminal and the like can be suppressed.

Effect of the Invention

According to the connector of the present invention, it is possible to provide a connector capable of suppressing a temperature rise at the time of energization.

DETAILED DESCRIPTION TO EXECUTE THE INVENTION

Hereinafter, embodiments are described.

Note that constituent elements may be enlargedly shown to facilitate understanding in the accompanying drawings. Dimension ratios of the constituent elements may be different from actual ones or those in other drawings. Further, hatching of some constituent elements may be omitted to facilitate understanding in sections.

(First Embodiment)

A first embodiment is described below in accordance with FIGS. 1 to 5.

Figure 1:
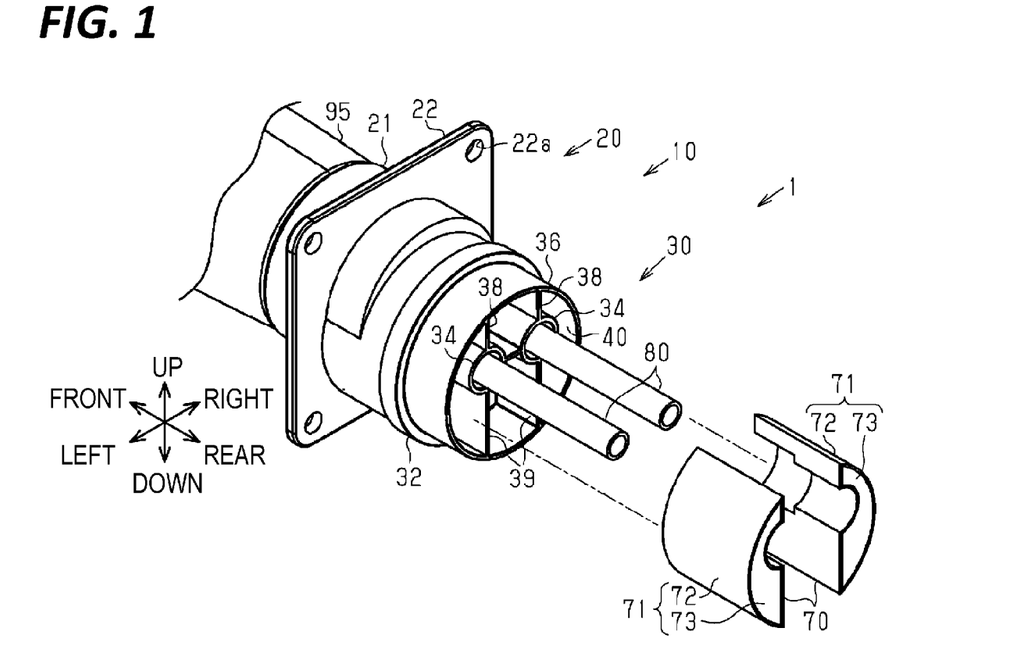
FIG. 1 is a perspective view of a connector according to a first embodiment.
Figure 2:
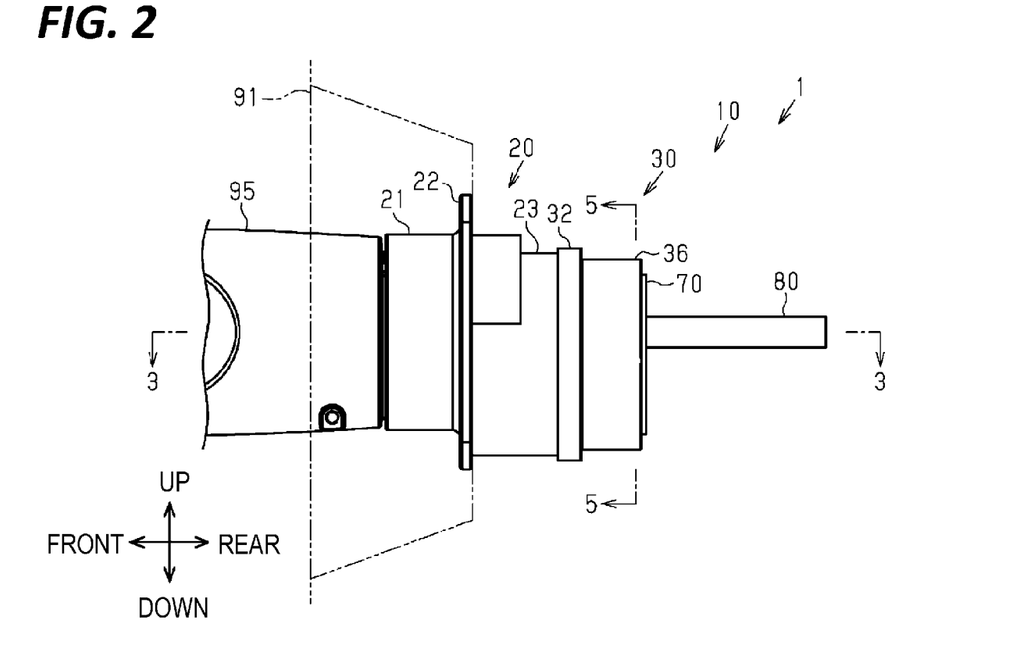
FIG. 2 is side view of the connector of the first embodiment.
Figure 3:
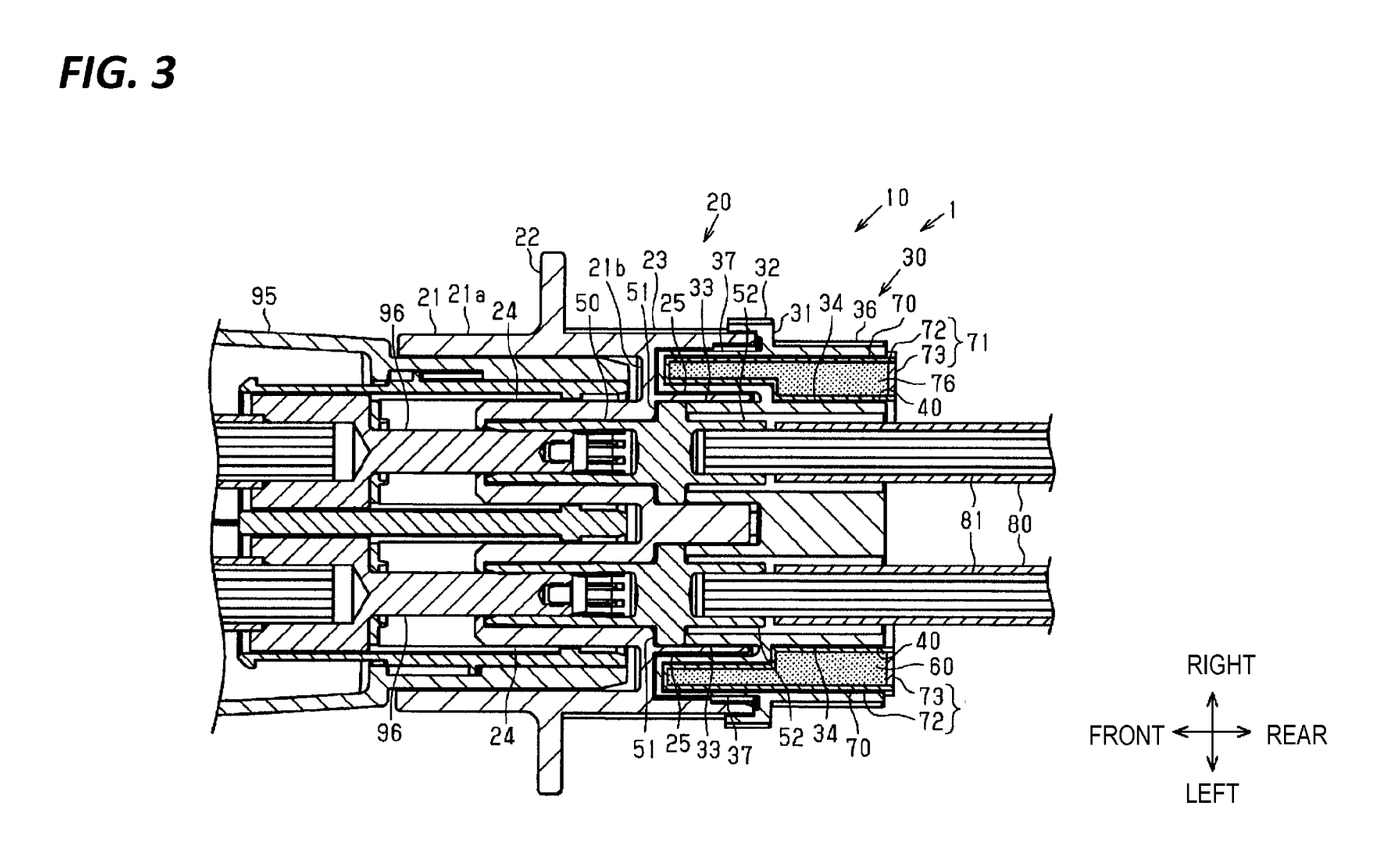
FIG. 3 is a section along 3-3 of the connector shown in FIG. 2.

A vehicle-side connector 1 shown in FIGS. 1 to 5 is for charging a power storage device equipped in a vehicle such an electric vehicle or a plug-in hybrid electric vehicle. As shown in FIG. 2, the vehicle-side connector 1 is fixed to a vehicle 91 by unillustrated fastening members such as bolts. The vehicle-side connector 1 is connected to the unillustrated power storage device via wires 80 shown in FIG. 1 and the like. As shown in FIGS. 2 and 3, a charger-side connector 95 as a mating connector is connected to the vehicle-side connector 1 from left in FIG. 2. This left side shown in FIGS. 2 and 3 is an outer side of the vehicle 91. A lateral direction shown in FIGS. 2 and 3 is an inserting/withdrawing direction of the charger-side connector 95. In the following description, a left side, a right side, an upper side and a lower side of FIG. 2 are referred to as a front side, a rear side, an upper side and a lower side. Further, an upper side and a lower side of FIG. 3 are referred to as a right side and a left side.

As shown in FIG. 3, the vehicle-side connector 1 includes a connector housing 10, a plurality of (two in this embodiment) vehicle-side terminals 50 and heat storage bodies 70. The connector housing 10 includes a housing body 20 and a retainer 30.

The housing body 20 is made of insulating synthetic resin. The housing body 20 includes a fitting portion 21, a flange portion 22, a tubular portion 23, terminal accommodating portions 24 and terminal holding portions 25.

The charger-side connector 95 is inserted into the fitting portion 21. The fitting portion 21 is in the form of a bottomed hollow cylinder with an open front end, and includes a hollow cylindrical receptacle 21a and a back wall portion 21b for closing the rear end of the receptacle 21a.

The flange portion 22 projects outward from the outer peripheral surface of the receptacle 21a. As shown in FIG. 1, the flange portion 22 is in the form of a substantially rectangular plate. The flange portion 22 includes a plurality of mounting holes 22 penetrating through the flange portion 22 in a front-rear direction. Unillustrated fastening members are inserted into the mounting holes 22a and the vehicle-side connector 1 is fixed to the vehicle 91 shown in FIG. 2 by these fastening members.

The tubular portion 23 extends rearward from the flange portion 22. The tubular portion 23 has a substantially hollow cylindrical shape. As shown in FIGS. 1 and 2, the tubular portion 23 is shifted downward with respect to the fitting portion 21 in the vehicle-side connector 1 of this embodiment.

As shown in FIG. 3, the terminal accommodating portion 24 extends forward from the back wall portion 21b. The terminal accommodating portion 24 has a substantially hollow cylindrical shape. Two terminal accommodating portions 24 are provided side by side in a lateral direction of the vehicle-side connector 1.

The terminal holding portions 25 are provided behind the back wall portion 21b. The terminal holding portion 25 has a substantially hollow cylindrical shape having an inner diameter larger than that of the terminal accommodating portion 24. Two terminal holding portions 25 are provided coaxially with the two terminal accommodating portions 24. The inside of the terminal holding portion 25 communicates with that of the terminal accommodating portion 24. The vehicle-side terminal 50 is inserted into the terminal accommodating portion 24 and the terminal holding portion 25. That is, the terminal accommodating portion 24 and the terminal holding portion 25 constitute a terminal accommodating tube for accommodating the vehicle-side terminal 50.

The vehicle-side terminal 50 is a female terminal and a charger-side terminal 96 of the charger-side connector 95 is inserted thereinto. The vehicle-side terminal 50 includes a protruding portion 51 projecting outward from an outer peripheral surface. This protruding portion 51 comes into contact with the rear surface of the back wall portion 21b. The vehicle-side terminal 50 includes a wire connecting portion 52 behind the protruding portion 51. In this embodiment, the wire connecting portion 52 has a hollow cylindrical shape and a core 81 of the wire 80 is inserted thereinto. The wire connecting portion 52 is connected to the core 81 of the wire 80, for example, by crimping.

As shown in FIGS. 1 to 3, the retainer 30 is mounted on the rear end of the tubular portion 23. The retainer 30 retains the vehicle-side terminals 50 shown in FIG. 3. The retainer 30 is made of synthetic resin.

As shown in FIG. 3, the retainer 30 includes a base portion 31, a peripheral wall 32, terminal pressing portions 33 and wire holding portions 34. The base portion 31 is in the form of a circular plate. The peripheral wall 32 projects forward from a peripheral edge part of the base portion 31. The peripheral wall 32 is disposed outside the tubular portion 23 of the housing body 20. Unillustrated engaging portions to be engaged with each other are formed on the peripheral wall 32 and the outer side surface of the tubular portion 23 of the housing body 20. The retainer 30 is mounted on the rear end of the tubular portion 23 by engaging the engaging portions of the peripheral wall 32 and the tubular portion 23.

The terminal pressing portions 33 project forward from the base portion 31. The terminal pressing portions 33 are provided at positions corresponding to the terminal holding portions 25 of the housing body 20. In this embodiment, the terminal pressing portion 33 is formed into a hollow cylindrical shape. The terminal pressing portion 33 is inserted between the inner surface of the terminal holding portion 25 and the outer surface of the vehicle-side terminal 50. The tip of the terminal pressing portion 33 comes into contact with the protruding portion 51 of the vehicle-side terminal 50 to retain the vehicle-side terminal 50 from behind.

The wire holding portions 34 project rearward from the base portion 31. The wire holding portions 34 are provided at positions corresponding to the terminal pressing portions 33. In this embodiment, the wire holding portion 34 is formed into a hollow cylindrical shape. The wire holding portion 34 is formed to have the same diameter as the terminal pressing portions 33. The inside of the wire holding portion 34 and that of the terminal pressing portion 33 communicate with each other. The wire 80 is inserted into the wire holding portion 34.

Figure 4:
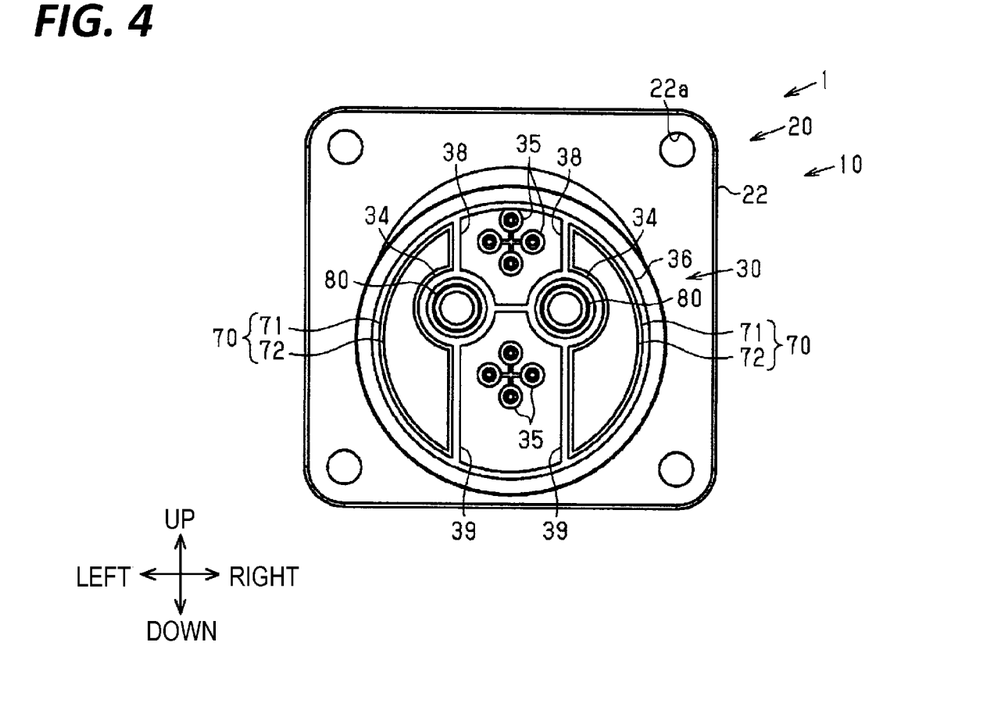
FIG. 4 is a back view of the connector of the first embodiment.
Figure 5:
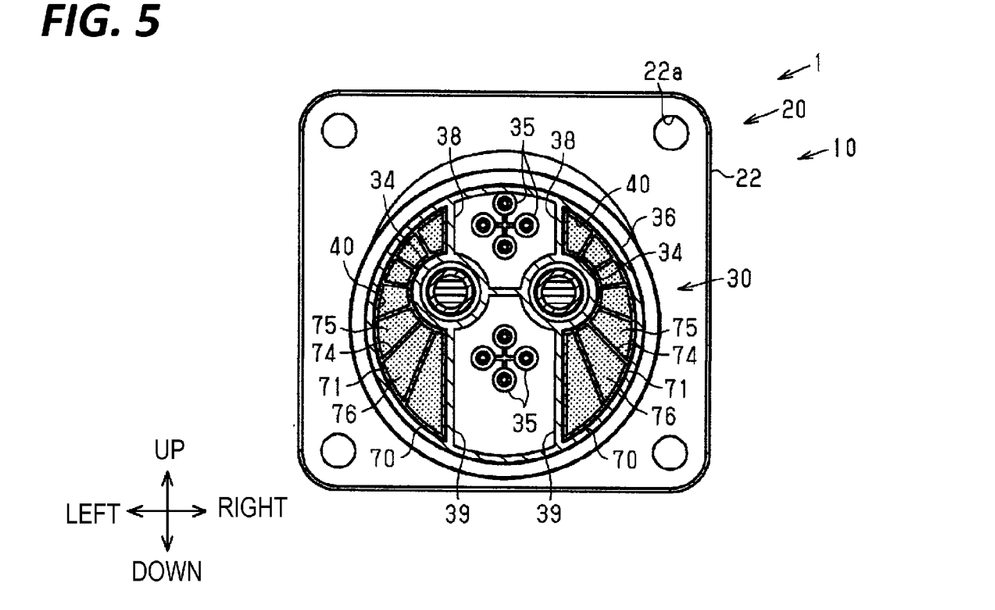
FIG. 5 is a section along 5-5 of the connector shown in FIG. 2.

Note that the retainer 30 of this embodiment includes a plurality of signal line holding portions 35 as shown in FIGS. 4 and 5. Although not shown, the vehicle-side connector 1 of this embodiment includes a plurality of signal terminals. The signal terminals are used for communication with a charging device. Similarly to the above vehicle-side terminals 50, the signal terminals are accommodated into the housing body 20 and retained by terminal holding portions of the retainer 30. Signal lines connected to the signal terminals are inserted into the signal line holding portions 35 of the retainer 30.

A surrounding wall portion 36 projects rearward from the base portion 31. The surrounding wall portion 36 is formed into a hollow cylindrical shape. The surrounding wall portion 36 collectively surrounds the pair of wire holding portions 34 and the plurality of signal line holding portions 35.

As shown in FIG. 3, the retainer 30 of this embodiment includes insertion portions 37 to be inserted between the terminal holding portions 25 and the tubular portion 23 of the housing body 20. The insertion portion 37 projects forward from the base portion 31. The insertion portion 37 is in the form of a bottomed tube open rearward and having a bottom part on a front side.

As shown in FIGS. 4 and 5, the retainer 30 of this embodiment further includes separation wall portions 38, 39. The separation wall portions 38, 39 extend from the wire holding portions 34 to the surrounding wall portion 36. The separation wall portions 38 of this embodiment extend upward from the wire holding portions 34 to the surrounding wall portion 36. Further, the separation wall portions 39 of this embodiment extend downward from the wire holding portions 34 to the surrounding wall portion 36.

The insertion portion 37, the separation wall portions 38, 39, the wire holding portion 34 and the surrounding wall portion 36 described above form an accommodation recess 40. The heat storage body 70 is accommodated in the accommodation recess 40.

The heat storage body 70 includes a case 71 and heat storage materials 76 accommodated in the case 71.

The case 71 includes a case body 72 in the form of a bottomed tube formed to contact the inner surface of the accommodation recess 40 and a lid member 73 for closing an opening of the case body 72.

A thermally expansible material or a material with good thermal conductivity can be used as a material of the case 71. Examples of the thermally expansible material include rubber, resin, metal and the like. By forming the case 71 using the thermally expansible material, the outer surface of the case 71 can be held in close contact with the inner surface of the accommodation recess 40. Examples of the rubber include EPDM (ethylene propylene diene rubber), silicon rubber, fluororubber and the like. Examples of the resin include epoxy resin, polyethylene resin, polyurethane resin and the like. Examples of the metal include copper (Cu), aluminum (Al) and the like.

The same material as the case body 72 can be used as a material of the lid member 73. The lid member 73 is fixed, for example, by ultrasonic welding, laser welding or another method.

The heat storage material 76 can temporarily store heat. A material utilizing latent heat during a phase change between liquid and solid can be used as the heat storage material 76. Further, a material having a melting point in a used temperature range can be used as the heat storage material 76. For example, the heat storage material 76 can be selected from compounds which are solid at a normal temperature, e.g. when the vehicle-side connector 1 is not energized, and are at least partially melted, softened, fluidized or liquefied when the temperature of the vehicle-side connector 1 (particularly, the vehicle-side terminals 50) rises and exceeds a predetermined value according to energization. The compound can reversibly return from liquid to solid when the energization to the vehicle-side connector 1 is finished and the temperature of the vehicle-side connector 1 (particularly, the vehicle-side terminals 50) drops. The compound can reversibly or repeatedly change between solid and liquid as the temperature of the terminals 50 rises from the normal temperature and drops to the normal temperature and may be called a reversible heat storage compound. The heat storage material 76 may be the single compound, may be a mixture of two or more types of the compounds or may be a composite of the compound and another type of compound or material. Paraffin, sodium sulfate tetrahydrate, sodium acetate trihydrate, vanadium dioxide and the like can be, for example, used as the material of the heat storage material 76.

In this embodiment, the case 71 is provided with at least one partition wall 74. The case 71 of this embodiment is provided with six partition walls 74. The partition walls 74 partition an internal space of the case 71 into a plurality of compartments 75. The above heat storage material 76 is accommodated in each of the compartments 75.

In this embodiment, each partition wall 74 is formed to extend from a part adjacent to the wire holding portion 34 to a part adjacent to the surrounding wall portion 36. Further, each partition wall 74 is formed to radially extend along a straight line passing through a center of the hollow cylindrical wire holding portion 34. In this way, the heat storage materials 76 accommodated in the respective compartments 75 are held in contact with the outer peripheral surfaces of the terminal holding portion 25 and the wire holding portion 34 shown in FIG. 3 by the radial partition walls 74. Thus, the heat storage material 76 in each compartment 75 stores heat generated from the terminal holding portion 25 and the wire holding portion 34.

The case 71 is closed by the lid member 73. The leakage of the heat storage materials 76 liquefied in the case 71 is prevented by the lid member 73. Note that the lid member 73 preferably renders the heat storage material 76 liquefied in each compartment 75 incapable of penetrating through the lid member 73.

Note that an adhesive, a thermal interface material (TIM) or the like may be interposed between the accommodation recess 40 of the retainer 30 and the case 71. An epoxy resin-based adhesive, a polyurethane-based adhesive or an acrylic resin-based adhesive can be used as the adhesive. Silicon grease or the like can be, for example, used as the thermal interface material.

(Functions)

Next, functions of the vehicle-side connector 1 configured as described are described above.

The charger-side connector 95 shown in FIG. 1 is connected to the vehicle-side connector and a charging current is supplied to the heat storage device of the vehicle from a charger outside the vehicle via the charger-side connector 95 and the vehicle-side connector 1. A large charging current is supplied to shorten a charging time. When the supply of this charging current is started, heat is generated in contact parts of the charger-side terminals 96 and the vehicle-side terminals 50, the vehicle-side terminals 50, connected parts of the vehicle-side terminals 50 and the wires 80 and the like. Thus, the entire vehicle-side terminals 50 are heated. The heat in the vehicle-side terminals 50 and the like suddenly increases at the start of charging and transitions at a temperature lower than a maximum temperature at the start when a predetermined time elapses.

The heat storage bodies 70 are accommodated in the connector housing 10. In this embodiment, the heat storage bodies 70 are accommodated in the retainer 30. The heat storage body 70 includes the case 71 and the heat storage materials 76 accommodated in the case 71. The heat storage materials 76 are for temporarily storing heat, and temporarily store latent heat (heat of dissolution) by being changed from solid to liquid by the heat generated in the vehicle-side terminals 50 and the like. That is, the heat storage materials 76 absorb the heat generated in the vehicle-side terminals 50. Therefore, sudden temperature rises of the vehicle-side terminals 50 can be suppressed.

The amount of heat transferred from the vehicle-side terminals 50 to the wires 80, the connector housing 10 and the like is reduced by the heat absorption of the heat storage materials 76. Thus, sudden temperature rises of the connector housing 10 and the like can be suppressed. Further, by using the heat storage materials 76, the maximum temperature can be lower than that in the case of not using the heat storage materials 76.

When time elapses from the start of the charging, the temperature of the vehicle-side terminals 50 transitions near a predetermined temperature. Thicknesses of the wires 80 and the heat resistance of the connector housing 10 are set to withstand a highest temperature even temporarily. In this embodiment, temperature rises of the wires 80 and the connector housing 10 can be suppressed by using the heat storage materials 76. Thus, thin wires 80, i.e. light wires 80, can be used.

The case 71 of the heat storage body 70 is, for example, formed of a thermally expansible material. Such a case 71 is expanded by heat transferred from the vehicle-side terminal 50 and the outer surface of the case 71 is held in close contact with the inner surface of the accommodation recess 40, whereby heat transfer can be more enhanced.

The retainer 30 of the vehicle-side connector 1 includes the separation wall portions 38, 39 extending from the terminal holding portions 25 to the surrounding wall portion 36. The heat of the vehicle-side terminals 50 is transferred from the terminal holding portions 25 holding the vehicle-side terminals 50 toward the surrounding wall portion 36. The heat storage body 70 is in contact with the separation wall portions 38, 39. Thus, the heat of the vehicle-side terminals 50 is easily absorbed by the heat storage materials 76 of the heat storage bodies 70. Therefore, the temperature rises of the vehicle-side terminals 50 and the wires 80 can be more suppressed.

Further, the retainer 30 includes the plurality of partition walls 74 partitioning the insides of the accommodation recesses 40. The heat storage materials 76 are accommodated in the compartments 75 partitioned by the respective partition walls 74. The heat of the vehicle-side terminals 50 is transferred to the heat storage materials 76 in the respective compartments 75 via the partition walls 74. Thus, the heat of the vehicle-side terminals 50 is easily absorbed by the heat storage materials 76. Therefore, the temperature rises of the vehicle-side terminals 50 and the wires 80 can be more suppressed.

The plurality of partition walls 74 are formed to radially extend along straight lines passing through a center of the vehicle-side terminal 50 inside the case 71. The heat of the vehicle-side terminal 50 is transferred toward the outside of the retainer 30 via the partition walls 74. Therefore, the heat of the vehicle-side terminal 50 can be efficiently radiated to the outside of the retainer 30.

When the charging is finished, the charger-side connector 95 is separated from the vehicle-side connector 1. The heat stored in the heat storage materials 76 of the vehicle-side connector 1 is gradually radiated via the connector housing 10. The heat storage materials 76 are solidified by heat radiation. Since no current flows into the vehicle-side terminals 50 when the charging is not performed, heat is not generated. The heat storage materials 76 radiate heat and are solidified.

As described above, the following effects are achieved according to this embodiment.

(1-1) The vehicle-side connector 1 includes the vehicle-side terminals 50, the connector housing 10 for holding the vehicle-side terminals 50 and the heat storage bodies 70 accommodated in the connector housing 10. The heat storage body 70 includes the case 71 to be accommodated into the connector housing and the heat storage materials 76 accommodated in the case 71. The charger-side connector 95 is connected to the vehicle-side connector 1 at the time of charging, i.e. in use. The large charging current flows into the vehicle-side terminals 50 to shorten the charging time. At the start of supplying this charging current, heat is generated in the contact parts of the charger-side terminals 96 and the vehicle-side terminals 50, the vehicle-side terminals 50, the connected parts of the vehicle-side terminals 50 and the wires 80 and the like. Since the heat storage materials 76 absorb the heat generated in the vehicle-side terminals 50, sudden temperature rises of the vehicle-side terminals 50 and the like can be suppressed.

(1-2) The connector housing 10 includes the accommodation recesses 40 for accommodating the heat storage bodies 70. In this way, the connector housing 10 accommodating the heat storage bodies 70 can be provided.

(1-3) The case 71 of the heat storage body 70 includes the partition walls 74 partitioning the internal space. The heat storage materials 76 are accommodated in the compartments 75 formed by partitioning the inside of the case 71 by the partition walls 74. By accommodating the heat storage materials 76 in the plurality of compartments 75, a biased distribution of the heat storage materials 76 can be reduced and the heat of the vehicle-side terminal 50 can be more easily absorbed.

(1-4) The plurality of partition walls 74 are formed to radially extend along the straight lines passing through the center of the vehicle-side terminal 50 inside the case 71. The heat of the vehicle-side terminal 50 is transferred toward the outside of the retainer 30 via the partition walls 74 of the case 71. Therefore, the heat of the vehicle-side terminal 50 can be efficiently radiated to the outside of the retainer 30.

(1-5) The heat storage bodies 70 constitute the connector housing 10 and are accommodated into the retainer 30 for retaining the vehicle-side terminals 50. Thus, a member for accommodating the heat storage bodies 70 needs not be separately provided and an increase in the number of members can be suppressed.

(1-6) The accommodation recesses 40 for accommodating the heat storage bodies 70 are formed by the terminal holding portions 25 for holding the vehicle-side terminals 50, the surrounding wall portion 36 surrounding the terminal holding portions 25 and the separation wall portions 38, 39 extending from the terminal holding portions 25 to the surrounding wall portion 36. By providing the accommodation recesses 40 inside the surrounding wall portion 36 of the retainer 30 in this way, the enlargement of the vehicle-side connector 1 can be suppressed as compared to the case where a part for accommodating the heat storage bodies 70 is separately provided outside the retainer 30.

(Second Embodiment)

A second embodiment is described below with reference to FIGS. 6 to 9.

A connector 100 shown in FIGS. 6 to 9 is, for example, a terminal block to be fixed to a case 191 of a device such as an inverter provided in a vehicle.

The connector 100 includes a connector housing 110 and device-side terminals 150. The connector housing 110 includes a housing body 120 and a shell 130. The shell 130 includes an accommodating portion 131 for accommodating the housing body 120 and a flange portion 132 to be fixed to the case 191 of the device. The shell 130 is, for example, made of metal.

Figure 6:
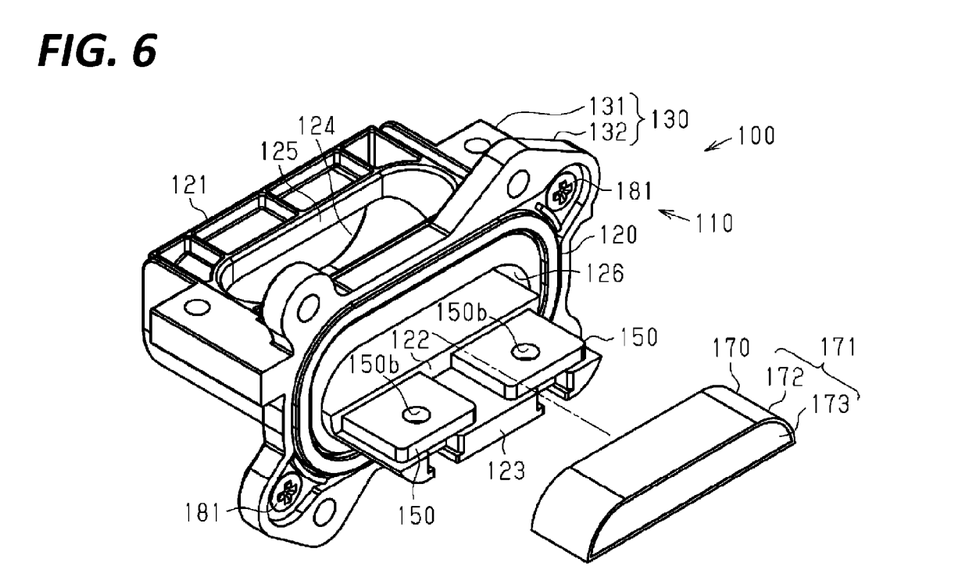
FIG. 6 is a perspective view of a connector of a second embodiment.
Figure 7:
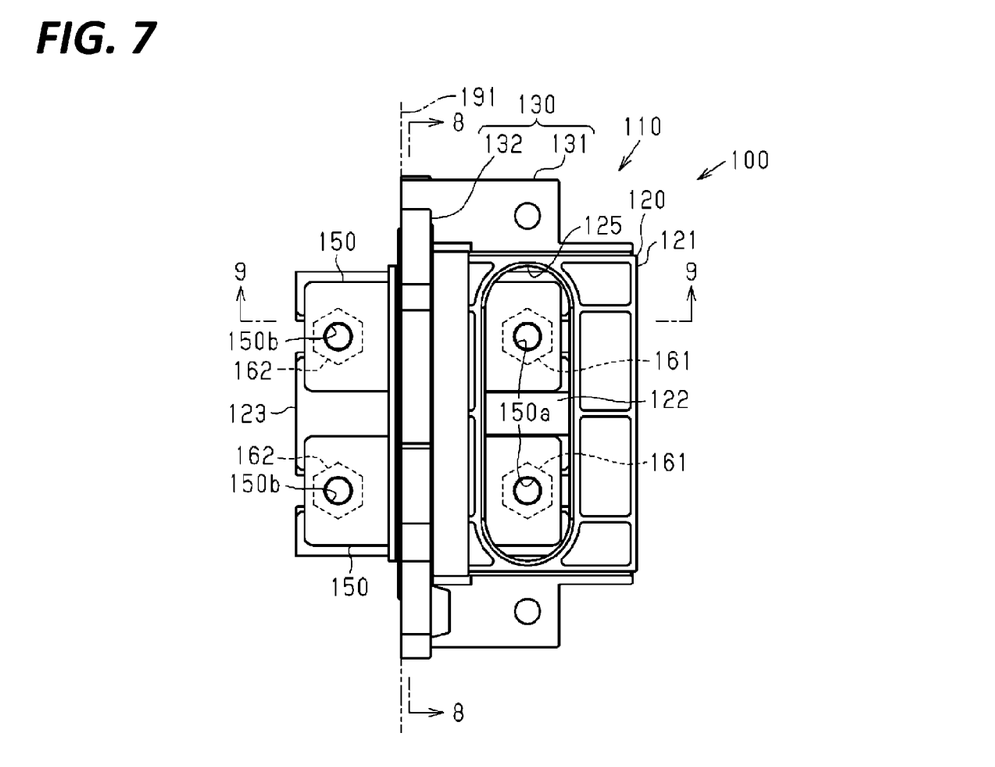
FIG. 7 is a plan view of the connector of the second embodiment.
Figure 8:
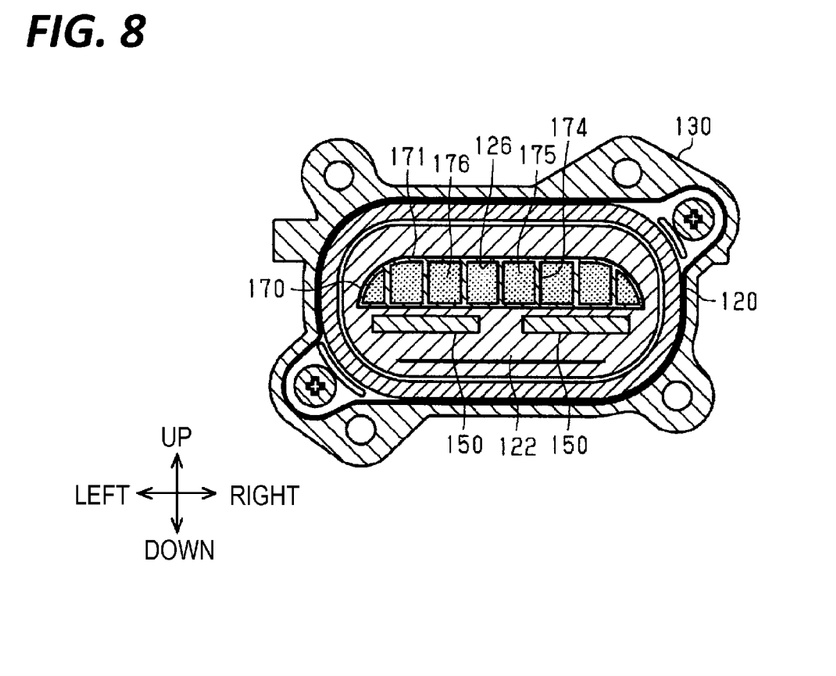
FIG. 8 is a section along 8-8 of the connector shown in FIG. 7.
Figure 9:
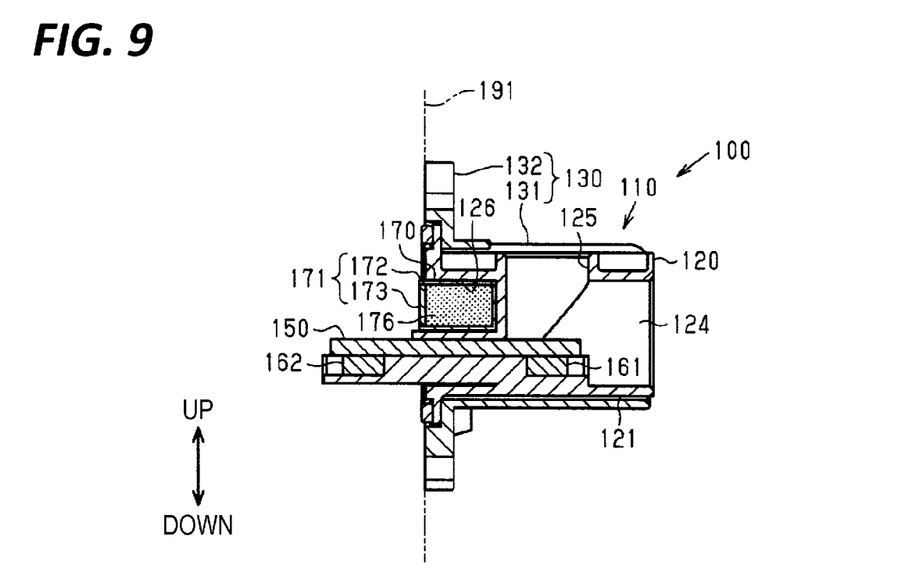
FIG. 9 is a section along 9-9 of the connector shown in FIG. 7.

The housing body 120 is, for example, made of synthetic resin. As shown in FIG. 6, the housing body 120 is fixed to the shell 130 by screws 181. The housing body 120 includes a fitting portion 121, a terminal holding portion 122 and a nut holding portion 123. The fitting portion 121 is formed into a substantially tubular shape and an unillustrated cable-side connector is fit thereinto. The terminal holding portion 122 holds the device-side terminals 150. The device-side terminals 150 are, for example, made of metal such as copper. Each of the two device-side terminals 150 is in the form of a rectangular plate. As shown in FIG. 8, the two device-side terminals 150 are arranged along a lateral direction. Insertion holes 150a, 150b are formed in both ends of the device-side terminals 150. The device-side terminals 150 are so held in the terminal holding portion 122 that end parts formed with the insertion holes 150a, 150b are exposed.

The above fitting portion 121 holds nuts 161 at positions corresponding to the insertion holes 150a of the device-side terminals 150. The nut holding portion 123 holds nuts 162 at positions corresponding to the insertion holes 150b of the device-side terminals 150 projecting from the housing body 120. The device-side terminals 150 are connected to terminals connected to end parts of wires inside the device by bolts inserted into the insertion holes 150a and the nuts 161.

The fitting portion 121 is formed with a first opening 124 and a second opening 125. The first opening 124 is for inserting the cable-side connector into the fitting portion 121. The second opening 125 is for inserting the bolts for connecting the device-side terminals 150 and wire-side terminals of the connector and a tool during a bolting operation. The first opening 124 is closed by the connector inserted into the fitting portion 121. The second opening 125 is closed by fixing an unillustrated cap to the shell 130.

The terminal holding portion 122 includes an accommodation recess 126. The accommodation recess 126 is recessed, above the device-side terminals 150, from a side where the device-side terminals 150 project toward the side of the fitting portion 121 into which the connector is fit. A heat storage body 170 is accommodated in the accommodation recess 126.

The heat storage body 170 includes a case 171 and heat storage materials 176 accommodated in the case 171.

The case 171 includes a case body 172 in the form of a bottomed tube formed to contact the inner surface of the accommodation recess 126, and a lid member 173 for closing an opening of the case body 172.

A thermally expansible material or a material with good thermal conductivity can be used as a material of the case 171. Examples of the thermally expansible material include rubber, resin, metal and the like. By forming the case 171 using the thermally expansible material, the outer surface of the case 171 can be held in close contact with the inner surface of the accommodation recess 126. Examples of the rubber include EPDM (ethylene propylene diene rubber), silicon rubber, fluororubber and the like. Examples of the resin include epoxy resin, polyethylene resin, polyurethane resin and the like. Examples of the metal include copper (Cu), aluminum (Al) and the like.

The same material as the case body 172 can be used as a material of the lid member 173. The lid member 173 is fixed, for example, by ultrasonic welding, laser welding or another method.

The heat storage material 176 can temporarily store heat. A material utilizing latent heat during a phase change between liquid and solid can be used as the heat storage material 176. Further, a material having a melting point in a used temperature range can be used as the heat storage material 176. Paraffin, sodium sulfate tetrahydrate, sodium acetate trihydrate, vanadium dioxide and the like can be, for example, used as the material of the heat storage material 176.

As shown in FIG. 8, the case 171 is provided with at least one partition wall 174. The connector 100 of this embodiment includes seven partition walls 174 in the case 171. The partition walls 174 partition the inside of the case 171 into compartments 175. In this embodiment, the partition wall 174 is formed to extend along a direction orthogonal to an arrangement direction of the two device-side terminals 150. As shown in FIG. 8, in this embodiment, the two device-side terminals 150 are arranged along a lateral direction of FIG. 8. The partition walls 174 are formed to extend in a vertical direction. The heat storage material 176 is accommodated in each compartment 175.

(Functions)

Next, functions of the connector 100 of this embodiment are described.

As shown in FIG. 8, the heat storage body 170 is accommodated in the connector housing 110. The heat storage body 170 includes the case 171 accommodated in the connector housing 110 and the heat storage materials 176 accommodated in the case 171. The heat storage materials 176 are for temporarily storing heat and temporarily store latent heat (heat of dissolution) by being changed from solid to liquid by heat generated in the device-side terminals 150 and the like. That is, the heat storage materials 176 absorb the heat generated in the device-side terminals 150. Therefore, sudden temperature rises of the device-side terminals 150 can be suppressed.

Further, the amount of heat transferred from the device-side terminals 150 to the wires, the connector housing 110 and the like is reduced by the heat absorption of the heat storage materials 176. Thus, sudden temperature rises of the connector housing 110 and the like can be suppressed. Further, by using the heat storage materials 176, a maximum temperature can be lower than that in the case of not using the heat storage materials 176.

When a predetermined time elapses from the start of charging, the temperature of the device-side terminals 150 transitions near a predetermined temperature. Thicknesses of the wires and the heat resistance of the connector housing 110 are set to withstand a highest temperature even temporarily. In this embodiment, temperature rises of the wires and the connector housing 110 can be suppressed by using the heat storage materials 176. Thus, thin wires, i.e. light wires, can be used.

The case 171 of the heat storage body 170 includes the plurality of partition walls 174 for partitioning the inside thereof. The heat storage materials 176 are accommodated in the compartments 175 partitioned by the respective partition walls 174. The heat of the device-side terminals 150 is transferred to the heat storage materials 176 in the respective compartments 175 via the partition walls 174. Thus, the heat of the device-side terminals 150 is easily absorbed by the heat storage materials 176. Therefore, the temperature rises of the device-side terminals 150 and the like can be more suppressed.

The plurality of partition walls 174 are formed to radially extend along the direction orthogonal to the arrangement direction of the device-side terminals 150. The heat of the respective device-side terminals 150 is transferred from the device-side terminals 150 to an upper part of the connector housing 110 via the partition walls 174 and radiated to the outside of the connector housing 110. Therefore, the heat of the device-side terminals 150 can be efficiently radiated to the outside of the connector housing 110.

As described above, the following effects are achieved according to this embodiment.

(2-1) The connector 100 includes the device-side terminals 150, the connector housing 110 for holding the device-side terminals 150 and the heat storage body 170 accommodated in the connector housing 110. The heat storage body 170 includes the case 171 accommodated in the connector housing 110 and the heat storage materials 176 accommodated in the case 171. The device-side terminals 150 generate heat by a current flowing when the connector 100 is used. Since the heat storage materials 176 absorb heat generated in the vehicle-side terminals 150, sudden temperature rises of the vehicle-side terminals 150 and the like can be suppressed.

(2-2) The housing body 120 of the connector housing 110 includes the accommodation recess 126 for accommodating the heat storage body 170. In this way, the connector 100 accommodating the heat storage materials 176 can be easily provided.

(2-3) The case 171 of the heat storage body 170 includes the partition walls 174 for partitioning the inside of the case 171. The heat storage materials 176 are accommodated in the compartments 175 partitioned by the partition walls 174. By accommodating these heat storage materials 176 into the plurality of compartments 175, a biased distribution of the heat storage materials 176 can be reduced and the heat of the device-side terminals 150 can be more easily absorbed.

(2-4) The plurality of partition walls 174 are formed to extend along the direction orthogonal to the arrangement direction of the device-side terminals 150. The heat of the device-side terminals 150 is transferred from the device-side terminals 150 to the upper part of the connector housing 110 via the partition walls 174. Therefore, the heat of the device-side terminals 150 can be efficiently radiated to the outside of the connector housing 110.

(Modifications)

Note that each of the above embodiments may be carried out in the following modes.

- In each of the above embodiments, the extending directions of the partition walls 74, 174 may be changed as appropriate.
- In each of the above embodiments, the number of the partition walls 74, 174 may be changed as appropriate.
- In each of the above embodiments, the partition walls 74, 174 may be omitted.
- Although the core 81 of the wire 80 is connected by being directly inserted into the vehicle-side terminal 50 in the first embodiment, a terminal connected to a core of a wire by a screw screwed into a vehicle-side terminal may be, for example, fixed to the vehicle-side terminal.
- In the second embodiment, the wire may be connected to the device-side terminal 150, such as by crimping.
- In each of the above embodiments and modifications thereof, the vehicle-side terminals 50 may be male terminals and the charger-side terminals 96 may be female terminals.

The present disclosure encompasses the following implementation examples. Typical constituent elements of the embodiments are denoted by reference signs not for limitation, but for understanding assistance.

[Addendum 1] One or more implementation examples of the present disclosure are directed to a connector (1) to be detachably connected to a mating connector (95) and the connector (1) may include a housing (10) to be mechanically connected to the mating connector (95), a terminal (50; 150) to be electrically connected to a mating terminal (96) of the mating connector (95), a heat storage material accommodation case (71; 171) to be mounted on the connector housing (10), the heat storage material accommodation case being an individual member different from the connector housing (10), and a heat storage material (76; 176) accommodated into the heat storage material accommodation case (71; 171), the heat storage material being an individual member different from the connector housing (10) and the heat storage material accommodation case (71; 171).

[Addendum 2] In several implementation examples, the heat storage material accommodation case (71; 171) may be mounted on the connector housing (10) detachably from the connector housing (10).

[Addendum 3] In several implementation examples, the heat storage material (76; 176) may contain a reversible heat storage compound which reversibly changes between solid and liquid as the temperature of the terminal (50; 150) rises from the normal temperature and drops to the normal temperature.

[Addendum 4] In several implementation examples, the heat storage material (76; 176) may contain a reversible heat storage compound which is solid at a normal temperature and at least partially melted, softened, fluidized or liquefied when the temperature of the terminal (50; 150) rises and exceeds a predetermined value.

[Addendum 5] In several implementation examples, the heat storage material accommodation case (71; 171) may be made of a material different from the heat storage material (76; 176) and may be made of a material capable of maintaining an original solid shape without being liquefied when the heat storage material (76; 176) is at least partially liquefied.

[Addendum 6] In several implementation examples, the heat storage material accommodation case (71; 171) may be mounted on the connector housing (10) with the heat storage material accommodation case (71; 171) and the terminal (50; 150) kept out of contact.

[Addendum 7] In several implementation examples, the heat storage material accommodation case (71; 171) and the connector housing (10) may be so configured that the heat storage material (76; 176) and the terminal (50; 150) are kept out of contact when the heat storage material accommodation case (71; 171) is mounted on the connector housing (10).

[Addendum 8] In several implementation examples, the heat storage material accommodation case (71; 171) can directly contact the connector housing (10).

[Addendum 9] In several implementation examples, the heat storage material accommodation case (71; 171) may be configured to contact the connector housing (10) with sliding resistance when the heat storage material (76; 176) is not melted, softened, fluidized or liquefied.

[Addendum 10] In several implementation examples, the heat storage material accommodation case (71; 171) may be configured to tightly contact the connector housing (10) when the heat storage material (76; 176) is at least partially melted, softened, fluidized or liquefied.

[Addendum 11] In several implementation examples, the connector housing (10) may include a housing body (20) for holding the terminal (50) and a retainer (30), which is an individual member different from the housing body (20), the retainer (30) may include a case accommodation chamber (40) for accommodating the heat storage material accommodation case (71; 171), and an outer surface of the heat storage material accommodation case (71; 171) and an inner surface of the case accommodation chamber (40) may be held in contact without forming any clearance.

[Addendum 12] In several implementation examples, the mating connector (95) may be a charger-side connector and the connector (1) may be a vehicle-side connector.

It would be apparent to a person skilled in the art that the present invention may be embodied in other specific forms without departing from the technical concept thereof. For example, some of the components described in the embodiments (or one or more modes thereof) may be omitted or several components may be combined. The scope of the present invention should be determined with reference to the appended claims, along with the full scope of equivalents to which such claims are entitled.

LIST OF REFERENCE NUMERALS

1 . . . vehicle-side connector, 10 . . . connector housing, 20 . . . housing body, 23 . . . tubular portion, 24 . . . terminal accommodating portion, 25 . . . terminal holding portion, 30 . . . retainer, 31 . . . base portion, 33 . . . terminal pressing portion, 34 . . . wire holding portion, 36 . . . surrounding wall portion, 37 . . . insertion portion, 38 . . . separation wall portion, 39 . . . separation wall portion, 40 . . . accommodation recess, 50 . . . vehicle-side terminal, 70 . . . heat storage body, 71 . . . case, 74 . . . partition wall, 76 . . . heat storage material, 80 . . . wire, 91 . . . vehicle, 100 . . . connector, 110 . . . connector housing, 120 . . . housing body, 122 . . . terminal holding portion, 126 . . . accommodation recess, 130 . . . shell, 150 . . . vehicle-side terminal, 170 . . . heat storage body, 171 . . . case, 174 . . . partition wall, 176 . . . heat storage material

What is claimed is:

1. A connector, comprising:
a terminal;
a connector housing for holding the terminal; and
a heat storage body accommodated in the connector housing,
wherein:
the heat storage body includes a case accommodated in the connector housing and a heat storage material accommodated in the case,
the connector housing includes an accommodation recess configured to accommodate the case of the heat storage body, and
the accommodation recess extends in a length direction of the terminal so that the heat storage material and the terminal extend in parallel to each other along the length direction of the terminal.

2. The connector of claim 1, wherein the case is made of rubber, resin or metal.

3. The connector of claim 1, wherein the case includes a partition wall for partitioning an internal space.

4. The connector of claim 3, wherein the partition wall is formed to radially extend along a straight line passing through a center of the terminal.

5. The connector of claim 1, wherein:
the connector housing includes a housing body having a terminal holding portion for holding the terminal and a retainer assembled with the housing body and having a terminal pressing portion for pressing the terminal by being inserted into the terminal holding portion, and
the retainer includes the accommodation recess.

6. The connector of claim 5, wherein:
the housing body includes a tubular portion to be fixed to the retainer,
the retainer includes a base portion, an insertion portion in the form of a bottomed tube extending from the base portion toward the housing body and to be inserted between the terminal holding portion and the tubular portion, a wire holding portion extending from the base portion in a direction opposite to the housing body, a wire connected to the terminal being inserted into the wire holding portion, a surrounding wall portion surrounding the wire holding portion and a separation wall portion extending from the terminal pressing portion to the surrounding wall portion, and
the accommodation recess is formed by the insertion portion, the surrounding wall portion, the separation wall portion and the terminal holding portion.

7. The connector of claim 1, wherein the connector housing is mounted on a vehicle and a charging connector is fit into the connector housing.

8. The connector of claim 3, wherein:
a plurality of the terminals are arranged along a first direction, and
the partition wall is formed to extend along a second direction orthogonal to the first direction.

9. The connector of claim 8, wherein:
the connector housing includes a housing body for holding the terminal and a shell, the housing body being mounted on the shell, and
the housing body includes the accommodation recess.

10. The connector of claim 9, wherein the shell of the connector housing is fixed to a case of a device equipped in a vehicle.

11. The connector of claim 1, wherein the connector housing is made of synthetic resin.

\* \* \* \* \*